C. H. Underwood,
Miter Box.
No. 88,230. Fig. 3. Patented Mar. 23, 1869.
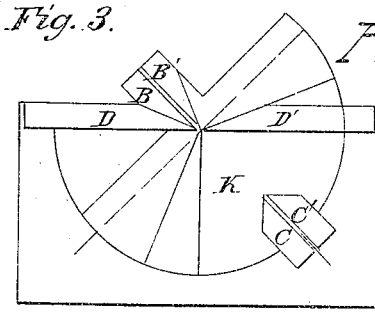
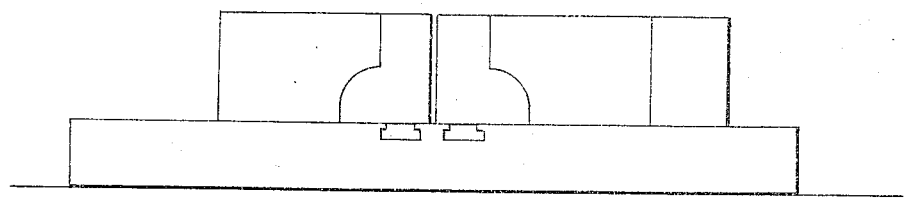
Fig. 1.
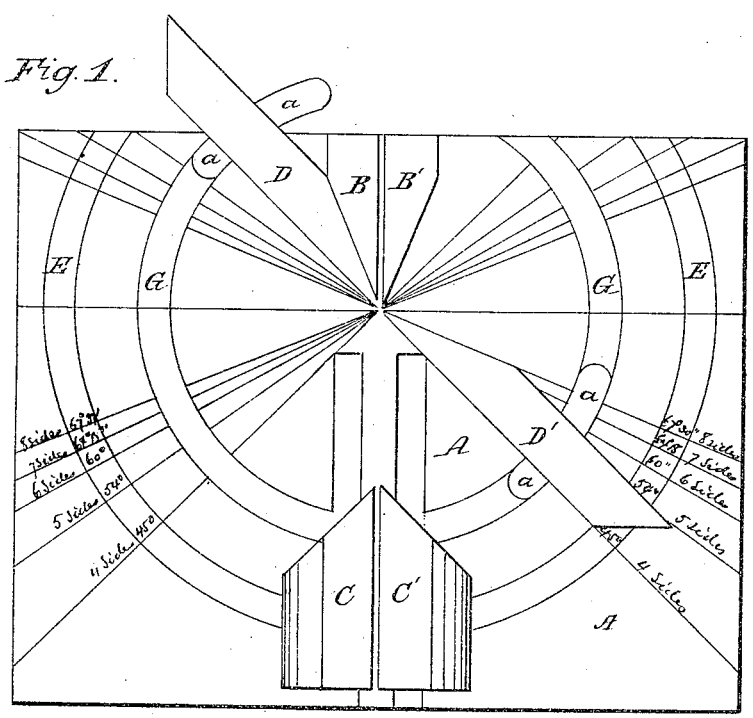
Witnesses —
F. H. Moore
Chas. F. Sleeper
Inventor.
Chas. H. Underwood

CHARLES H. UNDERWOOD, OF DORCHESTER, ASSIGNOR TO JAMES A. DUPEE, OF BOSTON, MASSACHUSETTS.

Letters Patent No. 88,236, dated March 23, 1869; antedated March 18, 1869.

IMPROVEMENT IN MITRE-BOXES.

The Schedule referred to in these Letters Patent and making part of the same.

*To all whom it may concern:*

Be it known that I, CHARLES H. UNDERWOOD, of Dorchester, in the county of Norfolk, and State of Massachusetts, have invented a new and improved Mitre-Box; and I do hereby declare that the following is a full, clear, and exact description of the construction and operation of the same, reference being had to the accompanying drawings, making a part of this specification, in which—

Figure 1 is a plan of the mitre-box;

Figure 2 is an elevation; and

Figure 3, a variation in the mode of constructing said box.

The nature of my invention consists in so forming a mitre-box, that by it a workman will be enabled to cut all the angles required for mitring various pieces of wood, or other material, by passing the saw always through the same guides, and presenting the piece to be cut to the saw, or the saw to the piece, at the proper angle for the work in hand.

I make my mitre-box with a platform, A, fixed saw-guide B B', movable saw-guide C C', radial arms D D', and scales of angles E E.

By having the saw-guide C C' movable, I can, in sawing small work, where the utmost accuracy is required, bring the guides B and C so close together that the object is practically obtained, and in all cases bring the guides for the saw so nearly in direct contact with the work, that the natural spring of the saw, and consequent irregularity of play, are reduced to their least amount.

I place the arms D D' upon bearers $a$, which are formed to fit in a circular groove, G, cut in the platform A.

The bearers $a$ are intended to give the arms a radial motion around the centre of the circle in which they travel, and to be clamped to the platform, when in position for the work, by any well-known clamping-device.

These arms are so arranged that they form one continuous bearing for the wood to be cut, just as in the well-known board-mitre box in common use. This I regard as an important feature of my mitre-box, because it prevents the wood from splintering, and at the same time allows it to be securely held, the bearing being near to and on each side of the saw.

To facilitate the operation of setting the arms at the exact angle at which they should present the work to the saw, I mark upon the platform A, certain scales of angles. The most usual angle for mitres, forty-five degrees, gives the angle for square work, or a rectangular four-sided figure; that of fifty-four degrees, gives the angle for a regular five-sided figure; sixty degrees, that for a six-sided figure, &c. These scales can, of course, be varied, as required by the varieties of work for which the box is employed.

A modification of my invention is shown in fig. 3, where I have reversed the relation of the arms and saw-guides, making the arms D D stationary, and attaching the guides B and C to a revolving plate, K, thus presenting the saw to the wood at the required angle, instead of presenting the wood to the saw.

I consider that for cheapness of construction and convenience, the device shown in figs. 1 and 2 is preferable.

The guides and radial arms can be made in sets, of different heights, and easily changed, to accommodate differing thicknesses of wood, and the saw-guides can be lined with horn, or some similar material, to prevent their wearing, and at the same time not injure the teeth of the saw.

I do not claim all radial arms, as I am aware that radial arms are shown in the patent of W. P. Wood, June 3, 1856, and arms that may act as such, in the patent of G. Trimble, December 19, 1865; but What I do claim as my invention, and desire to secure by Letters Patent, is—

The combination of the radial arms D D' with a platform, and saw-guides attached to the platform, when so arranged that the saw will pass between the arms, through the centre, from which they radiate, and the wood will have a bearing against the stroke of the saw, upon each arm, the opening between the arms being only sufficient to admit the free passage of the saw, all substantially as and for the purpose specified.

CHAS. H. UNDERWOOD.

Witnesses:
J. E. MAYNADIER,
CHAS. F. SLEEPER.